(12) United States Patent
Polizzi

(10) Patent No.: US 8,777,528 B2
(45) Date of Patent: Jul. 15, 2014

(54) OUTSIDE DIAMETER SHAFT REDUCER

(76) Inventor: Ronald Anthony Polizzi, Lake Forest, CA (US)

( * ) Notice: Subject to any disclaimer, the term of this patent is extended or adjusted under 35 U.S.C. 154(b) by 337 days.

(21) Appl. No.: 13/454,319

(22) Filed: Apr. 24, 2012

(65) Prior Publication Data

US 2013/0279999 A1     Oct. 24, 2013

(51) Int. Cl.
*B23B 5/12* (2006.01)
(52) U.S. Cl.
CPC .......................................... *B23B 5/12* (2013.01)
USPC ............................ 408/203.5; 408/204; 82/130
(58) Field of Classification Search
CPC ................ B23B 5/12; B27B 1/10; B27B 1/08
USPC .............. 408/203.5, 204, 206, 207; 144/205, 144/198.1; 82/130, 131
See application file for complete search history.

(56) References Cited

U.S. PATENT DOCUMENTS

| | | | | |
|---|---|---|---|---|
| 3,234,974 A * | 2/1966 | Ray | | 142/32 |
| 3,950,111 A * | 4/1976 | Churchwell et al. | | 408/204 |
| 4,114,484 A * | 9/1978 | Feamster, III | | 82/113 |
| 6,668,458 B1 * | 12/2003 | Schoenleber | | 30/90.1 |
| 7,611,312 B2 * | 11/2009 | Miyanaga | | 408/204 |

* cited by examiner

*Primary Examiner* — Daniel Howell
*Assistant Examiner* — Chwen-Wei Su
(74) *Attorney, Agent, or Firm* — Plager Schack LLP

(57) ABSTRACT

A outer diameter shaft reducer tool includes a cutter head and main body capable of assembly together through the use of a pair of set screws. The assembly can then easily be connected to a hand-held drill through a common extension thereby allowing for the provision of automated rotation of the cutting assembly. To reduce the outside diameter of a shaft, a user inserts the bar or rod into a lumen within the main body and applies pressure to cause a number of cutting teeth to engage the end portion of the bar or rod near the outer portion of the end face. As the teeth cut, the outside diameter of the shaft is thereby reduced.

10 Claims, 3 Drawing Sheets

OUTSIDE DIAMETER SHAFT REDUCER

BACKGROUND OF THE INVENTION

Frequently, a shaft such as a drive shaft becomes damaged and requires either repair or replacement. In some of these instances, it becomes necessary to reduce the diameter of the shaft near its end in order to create external threads with a die tool. In cases where replacement is necessary, a new bar must be modified into a shaft with threaded ends.

Presently, there is nothing on the market that is capable of reducing the outside diameter of a bar or rod without an engine lathe. Engine lathes are expensive, not portable and are generally only useable but a person knowledgeable in the user of a lathe. Generally, machine shops are the only place a person can to have a bar reduced in size for later threading with a die.

Thus, a need exists for an inexpensive, portable tool for shaft diameter reduction which can be used by a person without knowledge of engine lathe operation.

SUMMARY OF THE INVENTION

The present invention provides a means for reducing the outside diameter of a bar or rod without an engine lathe or expert knowledge. The reducer is portable and is as easy to operate as a hand-held drill.

A cutter head and main body are capable of assembly together through the use of a pair of set screws. The assembly can then easily be connected to a hand-held drill through a common extension thereby allowing for the provision of automated rotation of the cutting assembly. To reduce the outside diameter of a shaft, a user inserts the bar or rod into a lumen within the main body and applies pressure to cause a number of cutting teeth to engage the end portion of the bar or rod near the outer portion of the end face. As the teeth cut, the outside diameter of the shaft is thereby reduced.

DETAILED DESCRIPTION OF THE INVENTION

Figure 1:
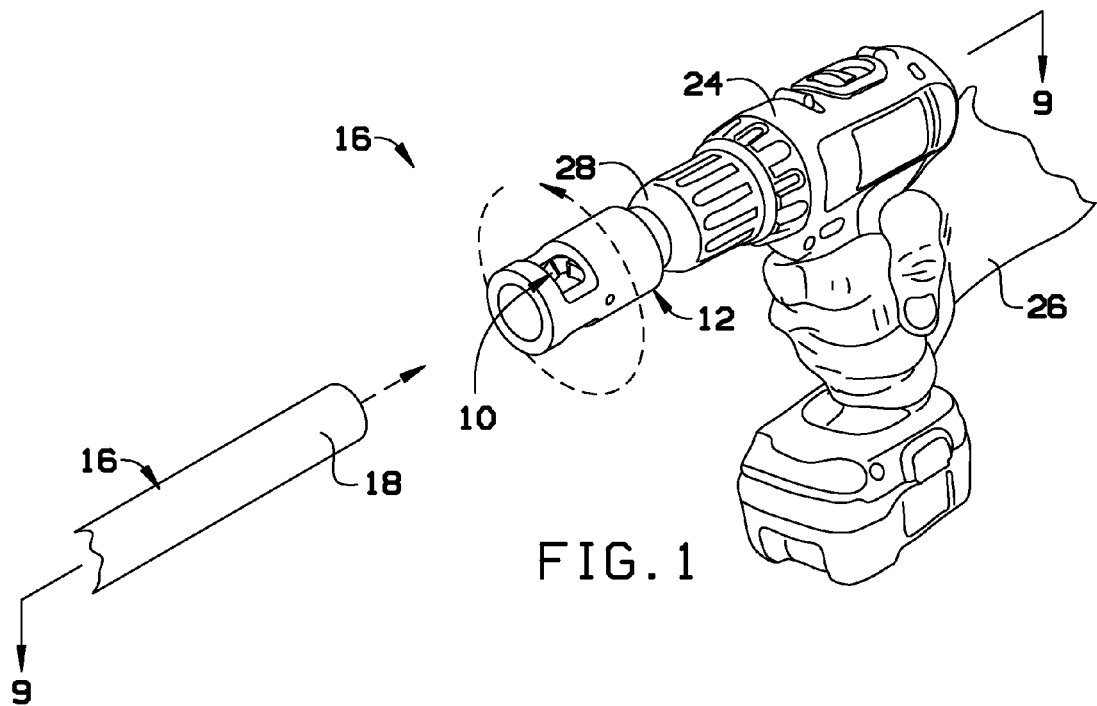
FIG. 1: is a perspective view of the invention shown in use pre-prior to insertion of an exemplary rod into cutter head and main body assembly.

As shown in, for example, FIG. 1, the reducer of the present invention is comprised primarily of three different components: a cutter head portion 10, a main body portion 12 and two set screws 14.

Figure 3:
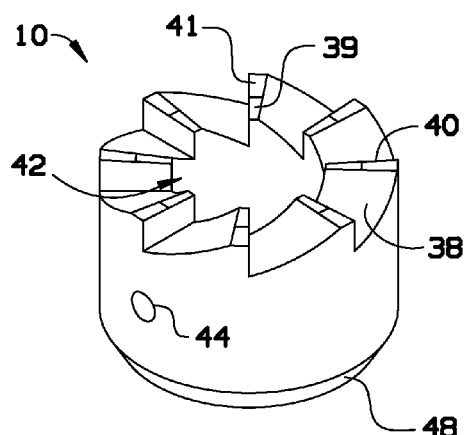
FIG. 3: is a perspective view of the cutter head according to the present invention.
Figure 4:
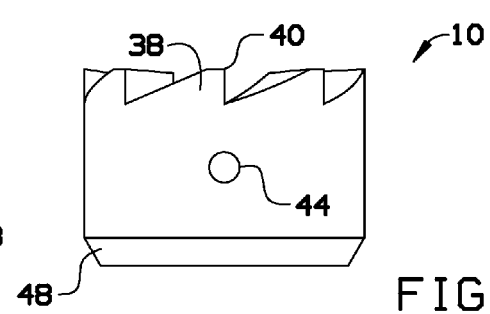
FIG. 4: is a side view of the cutter head according to the present invention.
Figure 5:
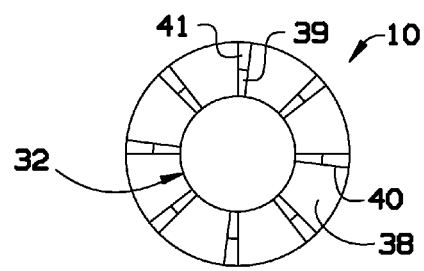
FIG. 5: is a top view of the cutter head only of the present invention.

Referring to FIGS. 3-5, cutter head portion 10 has a generally cylindrical shape, first and second ends and a central, head lumen 42 extending from the first end to the second end. A circumferential bevel is provided at the first end and eight cutting teeth 38 are provided at the second end. In an exemplary embodiment, the cutter head portion 10 has a diameter of approximately 1 inch.

Cutting teeth 38 are evenly spaced around an exterior circumference of the second end and alternate with provided flutes. Each tooth 38 has a cutting surface 40 facing away from the first end and extending from an outside diameter of the cutter head portion 10 to an inside diameter of the head lumen 42.

The cutting surface 40 is divided into two steps: a first step 39 near the head lumen 42 and a second step 41 near the exterior circumference of the cutter head portion 10. In the preferred embodiment, the first step 39 is closer to the first end than the second step 41. The first step 39 extends in a diametrical direction from the inner diameter of the head lumen 42 approximately half of the distance to the exterior circumference of the cutter head portion 10. During use of the reducer of the present invention, the first step 39 contacts the bar or rod work-piece 18 first. This helps to reduce binding of the cutting surfaces 40 against the bar or rod work-piece 18 since the initial cutting surface is smaller. In an exemplary embodiment, the arc length between teeth 38 is approximately 0.25 inches, the difference in height between the first step 39 and the second step 41 is approximately 0.015 inches, and each step extends for a length of approximately 0.25 inches.

Two threaded set screw holes 44 are formed in the cutter head portion 10 and extend from the exterior circumference toward the head lumen 42.

Figure 6:
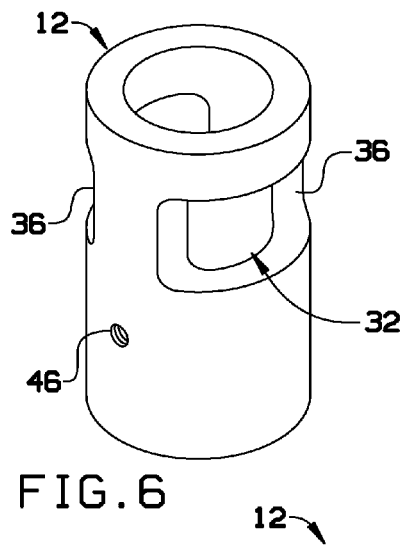
FIG. 6: is a perspective view of the main body according to the present invention.
Figure 7:
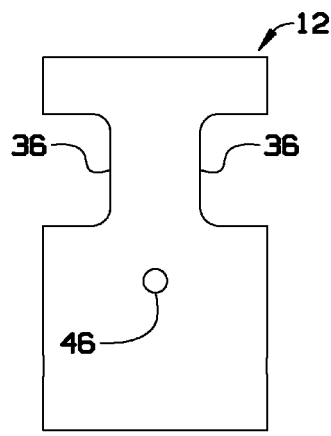
FIG. 7: is a side view of the main body according to the present invention according to the present.
Figure 8:
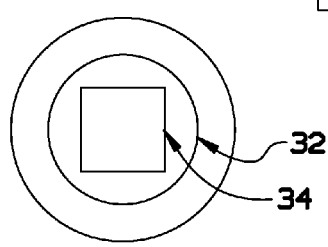
FIG. 8: is a top view of the main body according to the present invention.

As shown in FIGS. 6-8, main body portion 12 has a generally cylindrical shape, first and second ends and a body lumen 32 extending from the first end to near the second end. Body lumen 32 has an inner diameter slightly smaller than the exterior diameter of the cutter head portion 10. A square hole 34 is formed in the second end. Two diametrically opposed windows are formed in the main body portion 12 between an exterior circumference of the main body portion 12 and the body lumen 32. Windows 36 are formed closer to the first end than the second end and have a generally rectangular shape. Two threaded set screw holes 46 are provided in the main body portion 12 and extend from the exterior circumference toward the body lumen 32. Threaded set screw holes 46 are formed closer to the second end than the first end.

Two set screws 14 are provided for threaded engagement with the threaded set screw holes 44 and 46 of the cutter head portion 10 and the main body portion 12 to securely hold the cutter head portion 10 inside the body lumen 32 of the main body portion 12.

Figure 2:
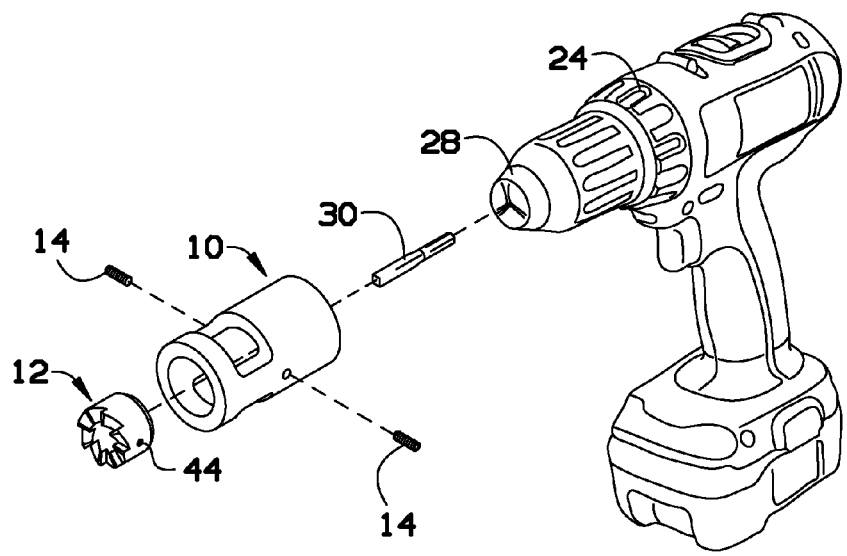
FIG. 2: is an exploded view of the cutter head according to the present invention.
Figure 9:
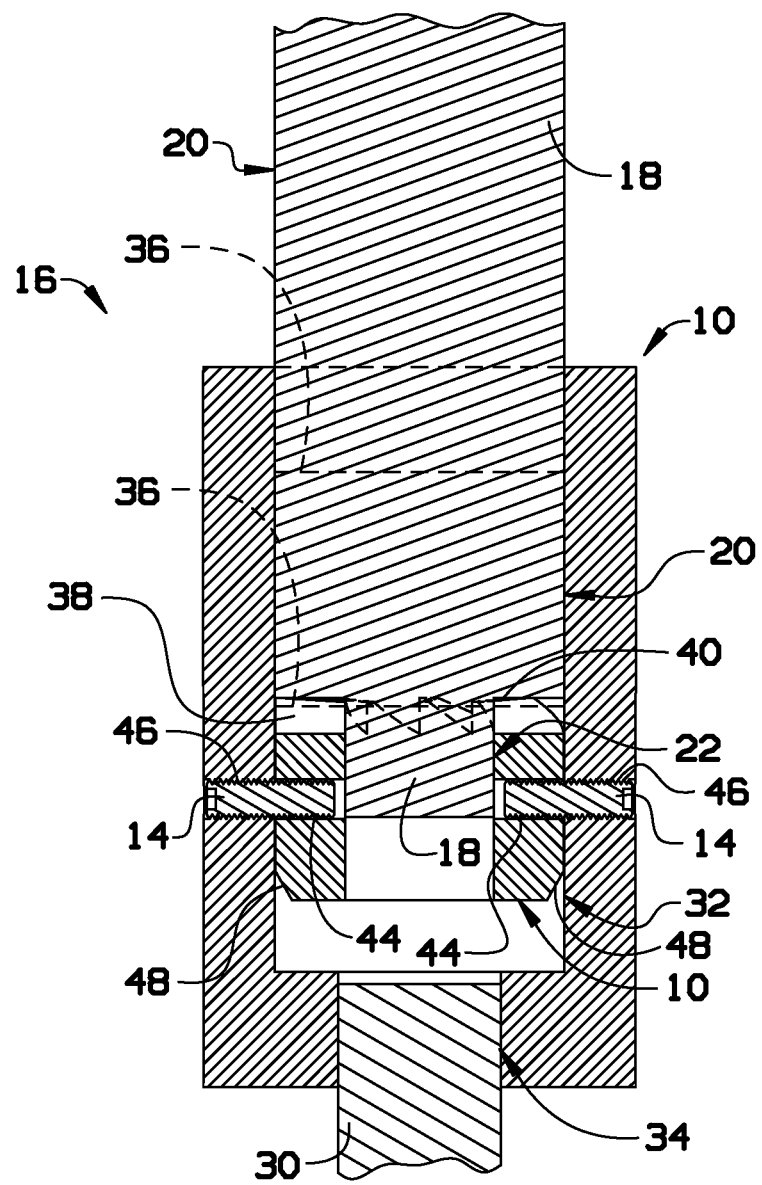
FIG. 9: is a section detail view of the invention along line 9-9 in FIG. 1 shown in use with an exemplary rod in the cutter head and main body assembly.

To operate, according to FIGS. 1 & 2, a drive extension 30 of a hand-held drill 24 may be placed into the square hole 34 to engage the main body portion 12 so that the hand-held drill 24 may cause a rotation of the main body portion 12 and the cutter head portion. Thus, as shown in FIG. 9, cutting teeth 38 are caused to cut an end surface of a rod work piece such as 18 received in the body lumen 32 of the main body portion 12 to reduce the exterior diameter of the rod work piece 18. The cutter head portion 10 is held within the main body portion 12, according to placement of the set screws 14, such that the cutting teeth 38 are adjacent the two windows such that cut pieces of the rod work piece may be expelled through the windows to an exterior of the main body portion 12.

The shaft reducer may be produced by reduction of materials through means of a CNC lathe and a CNC mill.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed is:

1. An outside diameter shaft reducer, comprising:
   a cutter head portion having a generally cylindrical shape, first and second ends and a central, head lumen extending from said first end to said second end;
      wherein a circumferential bevel is provided at said first end and eight cutting teeth are provided at said second end, said cutting teeth being evenly spaced around an exterior circumference of said second end;
         wherein each tooth has a cutting surface facing away from said first end and extending from an outside diameter of said cutter head to an inside diameter of said lumen;
            said cutting surface being divided into two steps: a first step near the head lumen and a second step near the exterior circumference of said cutter head wherein said first step is closer to said first end than said second step;
            wherein the first step extends in a diametrical direction from the inner diameter of the head lumen approximately half of the distance to the exterior circumference of said cutter head;
         one or more threaded set screw holes formed in said cutter head portion and extending from said exterior circumference toward said head lumen;
   a main body portion having a generally cylindrical shape, first and second ends and
   a body lumen extending from said first end to near said second end;
      said body lumen having an inner diameter slightly smaller than the exterior diameter of the cutter head portion;
      a square hole formed in said second end;
      two diametrically opposed windows formed in said main body portion between an exterior circumference of said main body portion and said body lumen; said windows being formed closer to said first end than said second end;
      said windows having a generally rectangular shape;
      one or more threaded set screw holes formed in said main body portion and extending from said exterior circumference toward said body lumen;
         said one or more threaded set screw holes being formed closer to said second end than said first end;
   a plurality of set screws for threaded engagement with said threaded set screw holes of said cutter head portion and said threaded set screw holes of said main body portion to securely hold said cutter head portion inside the body lumen of the main body portion;
   whereby a drive extension of a hand-held drill may be placed into said rectangular hole to engage said main body portion so that said hand-held drill may cause a rotation of said main body portion and said cutter head and such that said cutting teeth are caused to cut an end surface of a rod work piece received in said body lumen of said main body portion to reduce the exterior diameter of the rod work piece; and
   wherein the cutter head portion is held within said main body portion, according to placement of said set screws, such that said cutting teeth are adjacent said two windows such that cut pieces of the rod work piece may be expelled through said windows to an exterior of said main body portion.

2. An outside diameter shaft reducer, comprising:
   a cutter head portion having a generally cylindrical shape, first and second ends and a central, head lumen extending from said first end to said second end;
      a plurality of cutting teeth are provided at said second end, said cutting teeth being evenly spaced around an exterior circumference of said second end;
         wherein each tooth has a cutting surface facing away from said first end and extending from an outside diameter of said cutter head to an inside diameter of said lumen;
         one or more threaded set screw holes formed in said cutter head portion and extending from said exterior circumference toward said head lumen;
   a main body portion having a generally cylindrical shape, first and second ends and
   a body lumen extending from said first end to near said second end;
      said body lumen having an inner diameter slightly smaller than the exterior diameter of the cutter head portion;
      a square hole formed in said second end;
      two diametrically opposed windows formed in said main body portion between an exterior circumference of said main body portion and said body lumen; said windows being formed closer to said first end than said second end;
      said windows having a generally rectangular shape;
      one or more threaded set screw holes formed in said main body portion and extending from said exterior circumference toward said body lumen;
         said one or more threaded set screw holes being formed closer to said second end than said first end;
   a plurality of set screws for threaded engagement with said threaded set screw holes of said cutter head portion and said threaded set screw holes of said main body portion to securely hold said cutter head portion inside the body lumen of the main body portion;
   whereby a drive extension of a hand-held drill may be placed into said rectangular hole to engage said main body portion so that said hand-held drill may cause a rotation of said main body portion and said cutter head and such that said cutting teeth are caused to cut an end surface of a rod work piece received in said body lumen of said main body portion to reduce the exterior diameter of the rod work piece; and
   wherein the cutter head portion is held within said main body portion, according to placement of said set screws, such that said cutting teeth are adjacent said two windows such that cut pieces of the rod work piece may be expelled through said windows to an exterior of said main body portion.

3. The outer diameter shaft reducer as set forth in claim 2, wherein:
   a circumferential bevel is provided at said first end.

4. The outer diameter shaft reducer as set forth in claim 2, wherein:
   said cutting surface is divided into two steps: a first step near the head lumen and a second step near the exterior circumference of said cutter head wherein said first step is closer to said first end than said second step;

wherein the first step extends in a diametrical direction from the inner diameter of the head lumen approximately half of the distance to the exterior circumference of said cutter head.

5. The outer diameter shaft reducer as set forth in claim 2, wherein:
said plurality of cutting teeth comprises eight teeth.

6. An outside diameter shaft reducer, comprising:
a cutter head portion having a generally cylindrical shape and first and second ends;
one or more threaded set screw holes formed in said cutter head portion;
a main body portion having a generally cylindrical shape, first and second ends and a body lumen extending from said first end to near said second end;
said body lumen having an inner diameter slightly smaller than the exterior diameter of the cutter head portion;
a square hole formed in said second end;
one or more threaded set screw holes formed in said main body portion and extending from said exterior circumference toward said body lumen;
said one or more threaded set screw holes being formed closer to said second end than said first end;
a plurality of set screws for threaded engagement with said threaded set screw holes of said cutter head portion and said threaded set screw holes of said main body portion to securely hold said cutter head portion inside the body lumen of the main body portion;
whereby a drive extension of a hand-held drill may be placed into said rectangular hole to engage said main body portion so that said hand-held drill may cause a rotation of said main body portion and said cutter head such that said cutter head is caused to cut an end surface of a rod work piece received in said body lumen of said main body portion to reduce the exterior diameter of the rod work piece.

7. The outer diameter shaft reducer as set forth in claim 6, wherein:
a central, head lumen extends from said first end to said second end.

8. The outer diameter shaft reducer as set forth in claim 7, wherein:
a plurality of cutting teeth are provided at said second end, said cutting teeth being evenly spaced around an exterior circumference of said second end;
wherein each tooth has a cutting surface facing away from said first end and extending from an outside diameter of said cutter head to an inside diameter of said lumen.

9. The outer diameter shaft reducer as set forth in claim 8, wherein:
said cutting surface is divided into two steps: a first step near the head lumen and a second step near the exterior circumference of said cutter head wherein said first step is closer to said first end than said second step;
wherein the first step extends in a diametrical direction from the inner diameter of the head lumen approximately half of the distance to the exterior circumference of said cutter head.

10. The outer diameter shaft reducer as set forth in claim 6, further comprising:
two diametrically opposed windows formed in said main body portion between an exterior circumference of said main body portion and said body lumen; said windows being formed closer to said first end than said second end; said windows having a generally rectangular shape.

* * * * *